United States Patent
Black, Jr.

(10) Patent No.: US 8,529,239 B1
(45) Date of Patent: Sep. 10, 2013

(54) SOAP REMNANT MOLDING ASSEMBLY

(76) Inventor: Earl D. Black, Jr., Indianapolis, IN (US)

( * ) Notice: Subject to any disclaimer, the term of this patent is extended or adjusted under 35 U.S.C. 154(b) by 111 days.

(21) Appl. No.: 13/174,974

(22) Filed: Jul. 1, 2011

(51) Int. Cl.
*B29C 39/38* (2006.01)
*B29C 31/04* (2006.01)

(52) U.S. Cl.
USPC ........... 425/144; 425/160; 425/256; 425/443; 425/436 RM; 425/448; 425/803; 425/DIG. 13; 425/DIG. 110; 425/DIG. 132; 425/DIG. 246

(58) Field of Classification Search
USPC ................. 425/144, 160, 256, 407, 443, 441, 425/448, 436 RM, DIG. 13, DIG. 110, DIG. 132, DIG. 246, 803
See application file for complete search history.

(56) References Cited

U.S. PATENT DOCUMENTS

| | | | | |
|---|---|---|---|---|
| 4,030,867 A | * | 6/1977 | Everman | 425/144 |
| 4,296,064 A | * | 10/1981 | Satcher | 264/322 |
| 4,781,564 A | | 11/1988 | Cerrone | |
| 5,636,922 A | | 6/1997 | Clark | |
| 5,876,769 A | * | 3/1999 | Dowden et al. | 425/318 |
| D411,212 S | | 6/1999 | Jones | |
| 6,033,606 A | * | 3/2000 | Garza | 264/36.1 |
| 6,109,056 A | * | 8/2000 | Feldpausch | 62/356 |
| 6,119,461 A | * | 9/2000 | Stevick et al. | 62/3.64 |
| 6,511,626 B1 | * | 1/2003 | Hutcherson | 264/320 |
| 7,037,885 B2 | * | 5/2006 | Shimada et al. | 510/447 |
| 2003/0180411 A1 | * | 9/2003 | Hasegawa et al. | 425/564 |
| 2007/0011802 A1 | * | 1/2007 | Holland | 4/445 |
| 2010/0183789 A1 | * | 7/2010 | Zorovich et al. | 426/421 |

FOREIGN PATENT DOCUMENTS

| | | | |
|---|---|---|---|
| CN | 101210216 A | * | 7/2008 |
| CN | 201873662 A | * | 6/2011 |
| DE | 38 05 335 A1 | * | 8/1989 |
| JP | 07-316598 A | * | 12/1995 |
| WO | WO 98/25505 A1 | * | 6/1998 |

\* cited by examiner

*Primary Examiner* — Dimple Bodawala

(57) ABSTRACT

A soap remnant molding assembly is provided for combining, heating and re-forming small soap remnants into full size soap bars. The assembly includes a housing having a bottom and an exterior wall defining an interior space of the housing. A tray is positioned in the interior space. A plurality of heating elements is positioned in the interior space around the tray. A power source is operationally coupled to the heating elements and a switch is operationally coupled between the heating elements and the power source. The switch selectively activates and deactivates the heating elements to heat and then cool the tray such that the soap remnants convert to a liquid and the liquid in the tray subsequently hardens into a single soap bar.

9 Claims, 5 Drawing Sheets

SOAP REMNANT MOLDING ASSEMBLY

BACKGROUND OF THE DISCLOSURE

Field of the Disclosure

The disclosure relates to soap bar forming devices and more particularly pertains to a new soap bar forming device for combining, heating and re-forming small soap remnants into full size soap bars.

SUMMARY OF THE DISCLOSURE

An embodiment of the disclosure meets the needs presented above by generally comprising a housing having a bottom and an exterior wall defining an interior space of the housing. A tray is positioned in the interior space. A plurality of heating elements is positioned in the interior space around the tray. A power source is operationally coupled to the heating elements and a switch is operationally coupled between the heating elements and the power source. The switch selectively activates and deactivates the heating elements to heat and then cool the tray such that the soap remnants convert to a liquid and the liquid in the tray subsequently hardens into a single soap bar.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
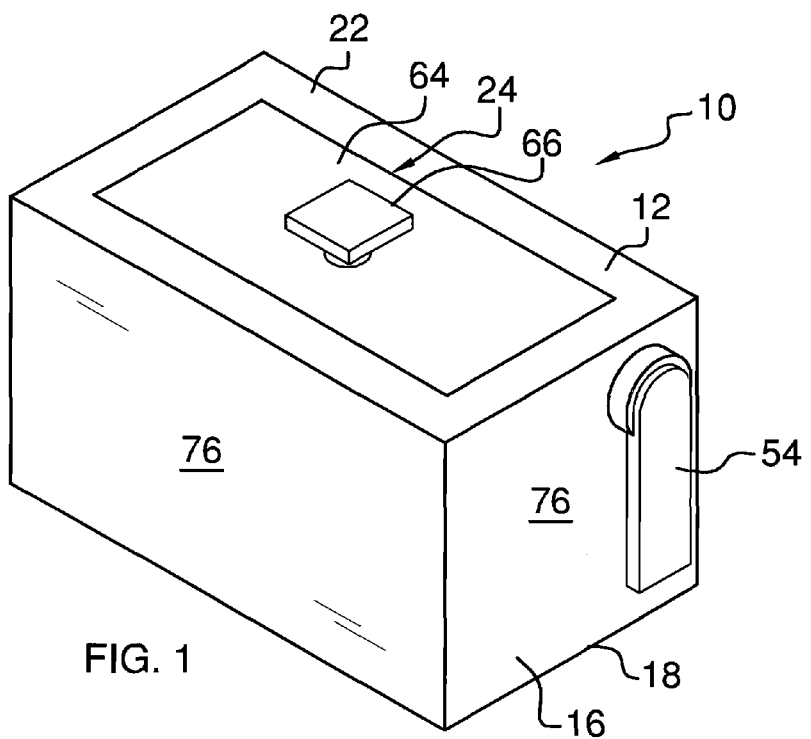
FIG. 1 is a top front side perspective view of a soap remnant molding assembly according to an embodiment of the disclosure.
Figure 2:
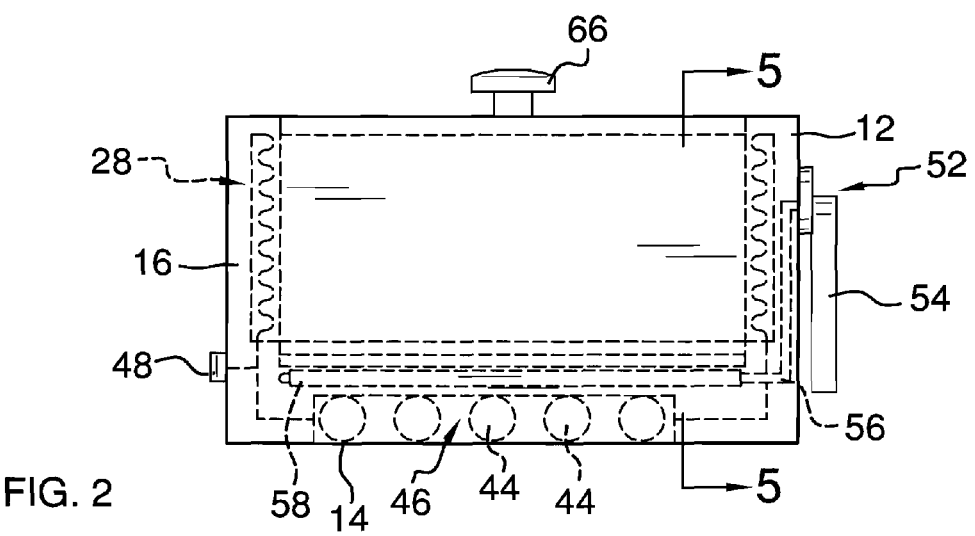
FIG. 2 is a front view of an embodiment of the disclosure.
Figure 3:
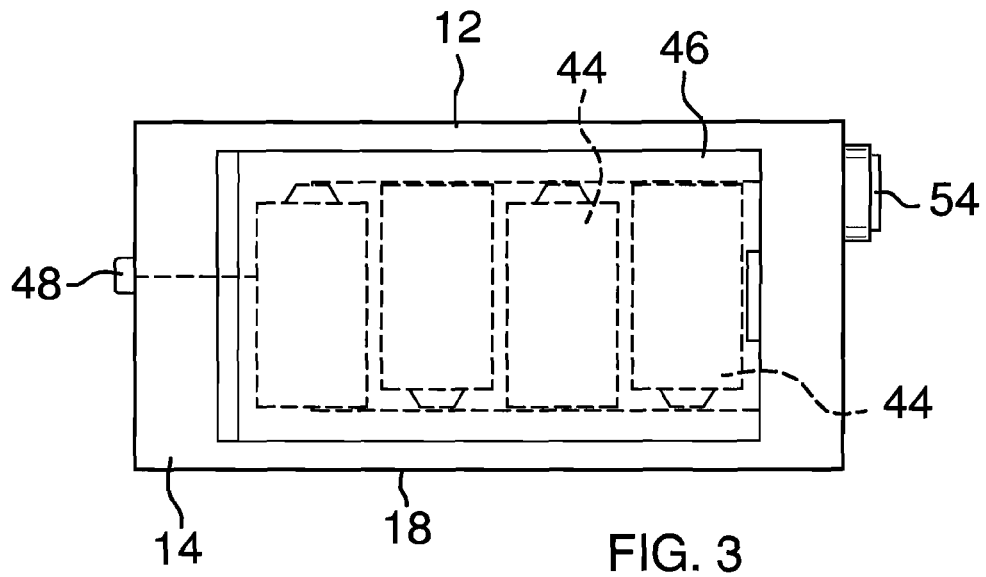
FIG. 3 is a bottom view of an embodiment of the disclosure.
Figure 4:
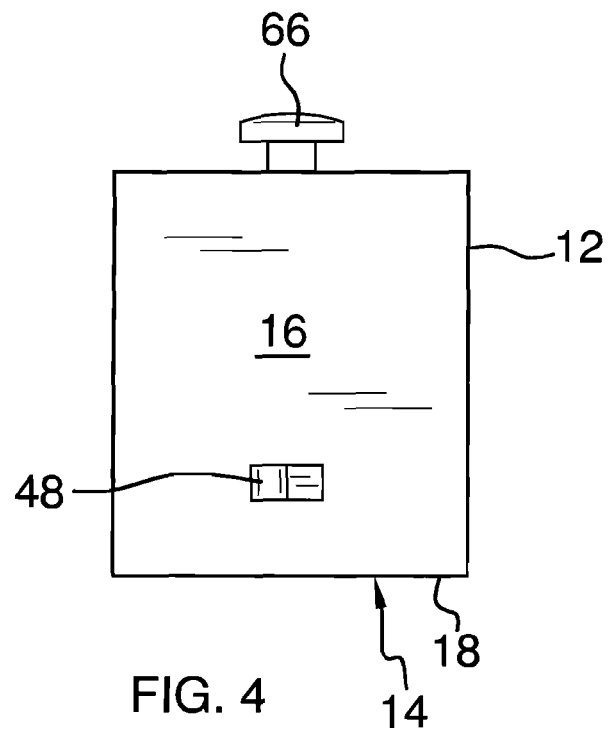
FIG. 4 is a side view of an embodiment of the disclosure.
Figure 5:
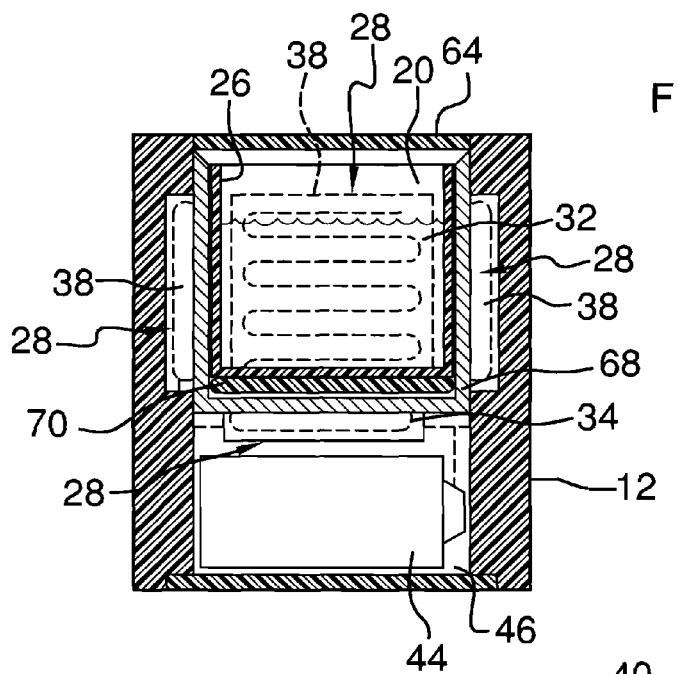
FIG. 5 is a cross-sectional view of an embodiment of the disclosure taken along line 5-5 of FIG. 2.
Figure 6:
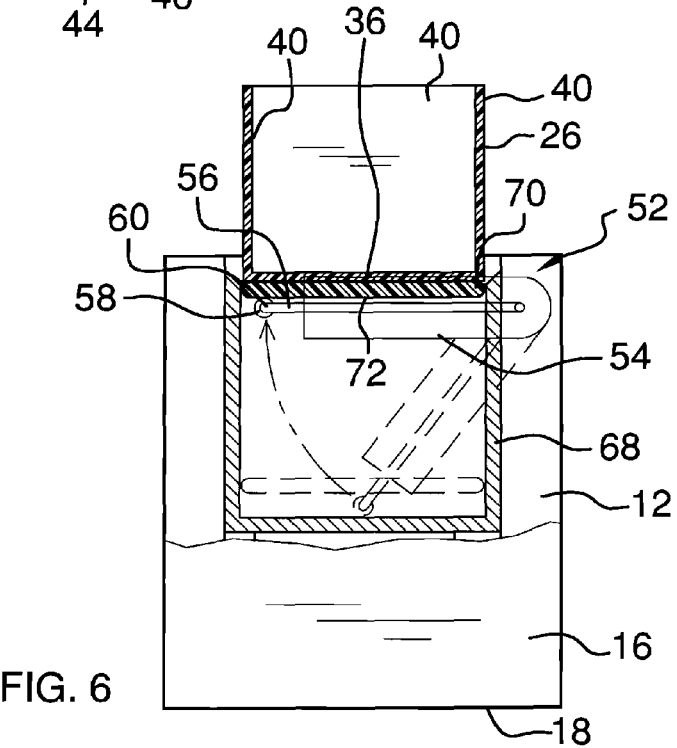
FIG. 6 is a partial cut-away side view of an embodiment of the disclosure.
Figure 7:
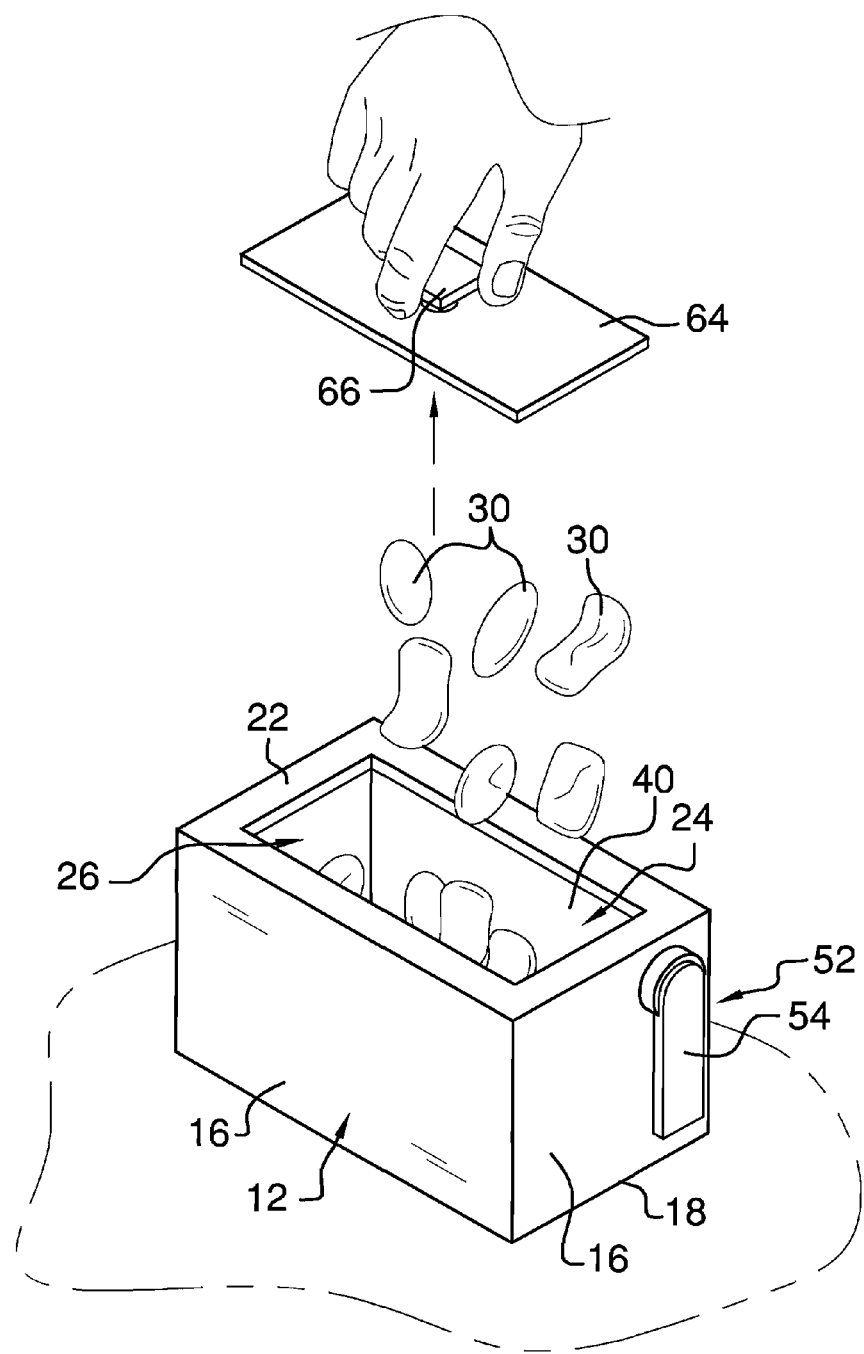
FIG. 7 is a top front side view of an embodiment of the disclosure in use.
Figure 8:
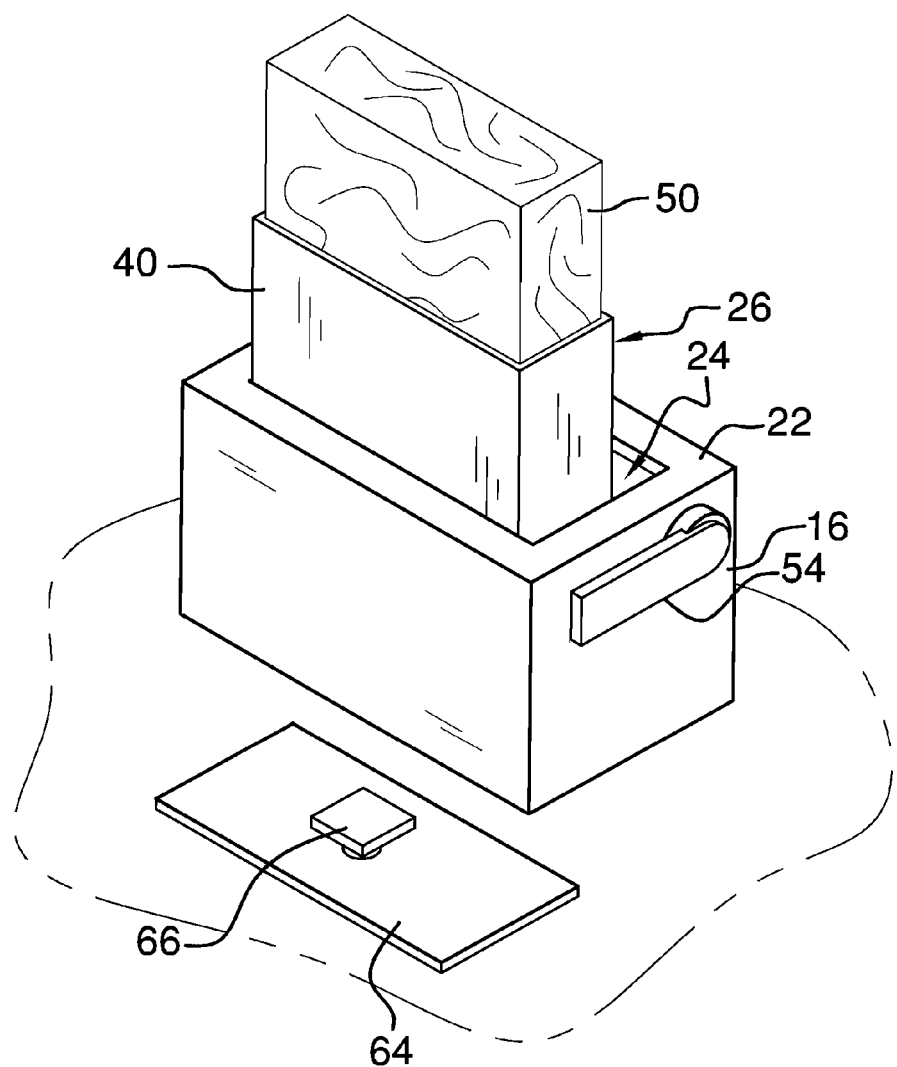
FIG. 8 is a top front side view of an embodiment of the disclosure in use.

With reference now to the drawings, and in particular to FIGS. 1 through 8 thereof, a new soap bar forming device embodying the principles and concepts of an embodiment of the disclosure and generally designated by the reference numeral 10 will be described.

As best illustrated in FIGS. 1 through 8, the soap remnant molding assembly 10 generally comprises a housing 12 including a bottom 14 and an exterior wall 16 extending upwardly from a perimeter edge 18 of the bottom 14. The bottom 14 and exterior wall 16 define an interior space 20 of the housing 12. The housing 12 also includes a top 22 and an opening 24 into the interior space 20 through the top 22 of the housing 12. A lid 64 may be coupled to the housing 12 closing over the opening 24 in the top 22 of the housing 12. A handle 66 may be coupled to the lid 64 to facilitate moving the lid 64.

A tray 26 is positioned in the interior space 20 of the housing 12. A plurality of heating elements 28 are also positioned in the interior space 20. The heating elements 28 are positioned around the tray 26. The heating elements 28 heat the tray 26 when the heating elements 28 are activated. The tray 26 may be constructed of a heat conducting material whereby the tray 26 is configured for melting soap remnants 30 together into a liquid 32 in the tray 26. The heating elements 28 more particularly may include a bottom element 34 positioned adjacent to a bottom 36 of the tray 26 when the tray 26 is positioned in interior space 20 of the housing 12. The heating elements 28 may also include a plurality of side elements 38. Each side element 38 may be positioned adjacent to an associated side wall 40 of the tray 26 when the tray 26 is positioned in the interior space 20 of the housing 12.

A power source 42 is operationally coupled to the heating elements 28. The power source 42 may be a self-contained battery 44 positioned in a battery compartment 46 positioned in the interior space 20. A switch 48 is operationally coupled between the heating elements 28 and the power source 42. The switch 48 is used for selectively activating the heating elements 28 to heat the tray 26. Conversely, the switch 48 is used for selectively deactivating the heating elements 28 whereby the switch 48 is configured for permitting the tray 26 to cool such that the liquid 32 in the tray 26 hardens into a single soap bar 50.

A lever assembly 52 may be coupled to the exterior wall 16 of the housing 12. The lever assembly 52 includes a pivoting lever 54 extending from an exterior surface 76 of the exterior wall 16. The lever assembly 52 includes an arm 56 positioned in the interior space 20. The arm 56 is positioned adjacent to the tray 26 whereby the tray 26 is urged upwardly by the arm 56 when the lever 54 is pivoted. A roller 58 may be coupled to and extend from an end 60 of the arm 56. The roller 58 extends across the bottom 34 of the tray 26 to lift the tray 26 when the lever 54 is pivoted.

A cradle 68 may be positioned in the interior space 20 of the housing 12. The heating elements 28 may be coupled directly to the cradle 68 and the tray 26 is then positioned in the cradle 68 when the tray 26 is positioned in the interior space 20 of the housing 12. A support panel 70 may be positioned in the interior space 20 between the roller 58 and the bottom 34 of the tray 26 when the tray 26 is positioned in the interior space 20 of the housing 12. Thus, the roller 58 may move across a bottom surface 72 of the support panel 70 while elevating or lowering the tray 26.

In use, the lid 64 is removed from the housing 12. The soap remnants 30 are placed into the tray 26 and the tray 26 is positioned in the housing 12 adjacent to the heating elements 28. The switch 48 is manipulated to activate the heating elements 28. The tray 26 and consequently the soap remnants 30 are heated until the soap remnants 30 liquefy within the tray 26. The switch 48 is then manipulated again to deactivate the heating elements 28 and the tray 26 is permitted to cool.

The liquid 32 in the tray 26 cools and hardens into the single bar of soap 50 having greater size than the soap remnants 30 used to make the bar of soap 50. The tray 26 is removable from the housing 12 and may be coated with a low friction surface material such as that used in conventional non-stick cookware to facilitate removal of the bar of soap 50 from the tray 26.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A soap remnant molding assembly comprising:
a housing having a bottom and an exterior wall extending upwardly from a perimeter edge of said bottom defining an interior space of said housing, said housing having a top and an opening into said interior space through said top of said housing;
a lid coupled to said housing, said lid closing over said opening in said top of said housing, said lid being flat such that only a perimeter edge and a bottom face of said lid extend downwardly into said housing;
a tray positioned in said interior space of said housing, said tray being rectangular;
a plurality of heating elements positioned in said interior space, said heating elements being positioned around said tray, said heating elements heating said tray when said heating elements are activated whereby said tray is configured for melting soap remnants together into a liquid in said tray;
a power source operationally coupled to said heating elements;
a switch operationally coupled between said heating elements and said power source, said switch selectively activating said heating elements to heat said tray, said switch selectively deactivating said heating elements whereby said switch is configured for permitting said tray to cool such that the liquid in said tray hardens into a single soap bar; and
a lever assembly coupled to said exterior wall of said housing, said lever assembly including a pivoting lever extending from an exterior surface of said exterior wall, said lever assembly including an arm positioned in said interior space, said arm being positioned adjacent to said tray whereby said tray is urged upwardly by said arm when said lever is pivoted.

2. The assembly of claim 1, further comprising:
a battery compartment positioned in said interior space; and
said power source being a battery positioned in said battery compartment.

3. The assembly of claim 1, further including a handle coupled to said lid.

4. The assembly of claim 1, wherein said heating elements include a bottom element positioned adjacent to a bottom of said tray when said tray is positioned in interior space of said housing.

5. The assembly of claim 4, wherein said heating elements include a plurality of side elements, each side element being positioned adjacent to an associated side wall of said tray when said tray is positioned in said interior space of said housing.

6. The assembly of claim 1, further including a cradle positioned in said interior space of said housing, said tray being positioned in said cradle when said tray is positioned in said interior space of said housing.

7. The assembly of claim 1, further including a roller coupled to and extending from an end of said arm, said roller extending across a bottom of said tray whereby said roller lifts said tray when said lever is pivoted.

8. The assembly of claim 7, further including a support panel positioned in said interior space, said support panel being positioned between said roller and said bottom of said tray when said tray is positioned in said interior space of said housing.

9. A soap remnant molding assembly comprising:
a housing having a bottom and an exterior wall extending upwardly from a perimeter edge of said bottom defining an interior space of said housing, said housing having a top and an opening into said interior space through said top of said housing;
a tray positioned in said interior space of said housing, said tray being rectangular;
a plurality of heating elements positioned in said interior space, said heating elements being positioned around said tray, said heating elements heating said tray when said heating elements are activated whereby said tray is configured for melting soap remnants together into a liquid in said tray, said heating elements including a bottom element positioned adjacent to a bottom of said tray when said tray is positioned in interior space of said housing, said heating elements including a plurality of side elements, each side element being positioned adjacent to an associated side wall of said tray when said tray is positioned in said interior space of said housing;
a power source operationally coupled to said heating elements;
a battery compartment positioned in said interior space, said power source being a battery positioned in said battery compartment;
a switch operationally coupled between said heating elements and said power source, said switch selectively activating said heating elements to heat said tray, said switch selectively deactivating said heating elements whereby said switch is configured for permitting said tray to cool such that the liquid in said tray hardens into a single soap bar;
a lever assembly coupled to said exterior wall of said housing, said lever assembly including a pivoting lever extending from an exterior surface of said exterior wall, said lever assembly including an arm positioned in said interior space, said arm being positioned adjacent to said tray whereby said tray is urged upwardly by said arm when said lever is pivoted;
a lid coupled to said housing, said lid closing over said opening in said top of said housing, said lid being flat such that only a perimeter edge and a bottom face of said lid extend downwardly into said housing;
a handle coupled to said lid;

a cradle positioned in said interior space of said housing, said tray being positioned in said cradle when said tray is positioned in said interior space of said housing;

a roller coupled to and extending from an end of said arm, said roller extending across a bottom of said tray whereby said roller lifts said tray when said lever is pivoted; and a support panel positioned in said interior space, said support panel being positioned between said roller and said bottom of said tray when said tray is positioned in said interior space of said housing.

* * * * *